United States Patent
Albert et al.

(10) Patent No.: US 11,168,221 B2
(45) Date of Patent: Nov. 9, 2021

(54) AQUEOUS CORROSION PROTECTION FORMULATION BASED ON SILANES

(71) Applicant: Evonik Operations GmbH, Essen (DE)

(72) Inventors: Philipp Albert, Loerrach (DE); Eckhard Just, Rheinfelden (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/251,303

(22) Filed: Jan. 18, 2019

(65) Prior Publication Data
US 2019/0153238 A1   May 23, 2019

Related U.S. Application Data

(63) Continuation of application No. 14/007,481, filed as application No. PCT/EP2012/053256 on Feb. 27, 2012, now abandoned.

(30) Foreign Application Priority Data

Mar. 25, 2011 (DE) ............. 10 2011 006 182.7
Oct. 7, 2011 (DE) ............. 10 2011 084 183.0

(51) Int. Cl.
| C09D 5/08 | (2006.01) |
| C09D 4/00 | (2006.01) |
| C09D 5/10 | (2006.01) |
| C23C 22/48 | (2006.01) |
| C23C 22/50 | (2006.01) |
| C23C 22/68 | (2006.01) |
| C23C 18/12 | (2006.01) |

(52) U.S. Cl.
CPC ............. *C09D 5/08* (2013.01); *C09D 4/00* (2013.01); *C09D 5/084* (2013.01); *C09D 5/10* (2013.01); *C23C 18/122* (2013.01); *C23C 18/127* (2013.01); *C23C 18/1254* (2013.01); *C23C 22/48* (2013.01); *C23C 22/50* (2013.01); *C23C 22/68* (2013.01); *C23C 2222/20* (2013.01); *Y10T 428/31663* (2015.04)

(58) Field of Classification Search
CPC . C09D 4/00; C09D 5/10; C09D 5/084; C09D 5/08; C23C 22/48; C23C 22/50; C23C 22/68; C23C 18/122; C23C 18/1254; C23C 18/127; C23C 2222/20; Y10D 428/31663
See application file for complete search history.

(56) References Cited

U.S. PATENT DOCUMENTS

| 6,468,336 B1 | 10/2002 | Fiedler et al. |
| 7,427,442 B2 | 9/2008 | Albert et al. |
| 8,128,748 B2 | 3/2012 | Sutter et al. |
| 8,298,679 B2 * | 10/2012 | Albert ............. C03C 17/30 106/14.15 |
| 8,377,191 B2 | 2/2013 | Sutter et al. |
| 8,394,972 B2 | 3/2013 | Wassmer et al. |
| 8,889,812 B2 | 11/2014 | Albert et al. |
| 2004/0253470 A1 * | 12/2004 | Aamodt .............. B27K 3/16 428/537.1 |
| 2007/0054056 A1 | 3/2007 | Albert et al. |
| 2008/0213598 A1 | 9/2008 | Papendick et al. |
| 2008/0233341 A1 | 9/2008 | Jenkner et al. |
| 2008/0234417 A1 * | 9/2008 | Kruse .............. C09D 4/00 524/259 |
| 2009/0005518 A1 | 1/2009 | Just et al. |
| 2010/0273013 A1 | 10/2010 | Jin et al. |
| 2010/0310877 A1 | 12/2010 | Parker et al. |
| 2011/0098397 A1 | 4/2011 | Plehiers et al. |
| 2011/0259240 A1 | 10/2011 | Jenkner et al. |
| 2011/0268899 A1 | 11/2011 | Albert et al. |
| 2012/0031302 A1 | 2/2012 | Albert et al. |
| 2012/0204762 A1 | 8/2012 | Albert et al. |
| 2013/0085210 A1 | 4/2013 | Friedel et al. |
| 2013/0087080 A1 | 4/2013 | Friedel et al. |
| 2013/0192494 A1 | 8/2013 | Friedel et al. |

FOREIGN PATENT DOCUMENTS

| DE | 10 2008 007 261 | 3/2009 | |
| EP | 1 191 075 | 3/2002 | |
| EP | 2 390 296 | 11/2011 | |
| JP | 2007-70629 | 3/2007 | |
| JP | 2009-507100 | 2/2009 | |
| JP | 2010-537017 | 12/2010 | |
| WO | 2004/076717 | 9/2004 | |
| WO | 2005/014741 | 2/2005 | |
| WO | 2006/079516 | 8/2006 | |
| WO | 2006/137663 | 12/2006 | |
| WO | 2009/030538 | 3/2009 | |
| WO | WO 2009/030538 | * 3/2009 | ............. C08L 83/08 |
| WO | 2010/121872 | 10/2010 | |
| WO | 2011/121038 | 10/2011 | |

OTHER PUBLICATIONS

International Search Report dated May 29, 2012 in PCT/EP2012/053256.

* cited by examiner

*Primary Examiner* — Amina S Khan
(74) *Attorney, Agent, or Firm* — Grüneberg and Myers PLLC

(57) ABSTRACT

The present invention relates to a composition comprising —a specific binder containing at least one cocondensate based on at least one ω-glycidyloxyalkylalkoxysilane and a bis(alkoxyalkylsilyl)amine, —water, —alcohol in an amount of less than 3% by weight, based on the composition, —at least one addition selected from the group consisting of particulate metals, metal alloys and metal compounds and —optionally at least one additive, where the pH of the composition is from 1 to 14 and the dry residue of the binder is from 1 to 50% by weight, based on the binder used, a process for the production thereof and also the use thereof for coatings, in particular for the protection of metals against corrosion.

13 Claims, No Drawings

AQUEOUS CORROSION PROTECTION FORMULATION BASED ON SILANES

This application is a continuation of U.S. application Ser. No. 14/007,481, filed on Jan. 2, 2014, now abandoned, which was the National Stage entry under § 371 of International Application No. PCT/EP12/53256, filed on Feb. 27, 2012, and which claims the benefit of German Application No. 102011006182.7, filed on Mar. 25, 2011 and German Application No. 10 2011 084 183.0, filed on Oct. 7, 2011.

The present invention relates to a new anti-corrosion formulation based on an aqueous silane system as binder, to a process for preparing it and to the use thereof for coatings, more particularly for protecting metals from corrosion.

Interest is increasingly being focussed on aqueous silane systems, since they contain less or no organic solvent and therefore are more eco-friendly. These systems, furthermore, can be employed without explosion prevention measures. Stable, aqueous silane systems are not preparable simply by mixing silanes with water, since many silanes are insoluble in the aqueous phase and undergo hydrolysis and condensation on contact with water. In corrosion control, therefore, it is customary to use silane systems with organic solvents and defined amounts of water. In order to modify the properties of the silane systems and to enhance the corrosion control, they can be formulated with additives, pigments and fillers.

The preparation of water-soluble aminopolysiloxanes is described in EP 0 590 270. The aminosilanes in a 50% strength alcoholic solution are admixed with a corresponding amount of water and subjected to initial hydrolysis at 60° C. These products are subsequently soluble in water. Disadvantages continue to be the high level of organic solvents and the associated low flash point.

DE 103 35 178 likewise describes the preparation of water-soluble silane systems, an example being a mixture of 3-aminopropyltrialkoxysilane and bis(trialkoxysilylpropyl)amine. The silane mixture is subjected to initial hydrolysis with a defined amount of water. Here again, however, the silane mixture contains 25% to 99.99% alcohol and is therefore not VOC-free.

U.S. Pat. No. 5,051,129 claims the composition of an aqueous solution which consists of a water-soluble aminosilane and an alkyltrialkoxysilane. It is prepared by adding a defined amount of water to the silane mixture, followed by heat treatment at 60° C. The silane mixture prepared in this way is dissolved in water, in a specific proportion, and is used to impart water repellency to surfaces.

EP 0 716 128 claims water-based, organopolysiloxane-containing compositions, processes for preparing them and use thereof. Mixing water-soluble aminoalkylalkoxysilanes with alkyltrialkoxysilanes and/or dialkyldialkoxysilanes and adding water at a defined pH produces compositions containing organopolysiloxane. The hydrolysis alcohol formed is removed by distillation. Consequently, VOC-free, aqueous, polysiloxane-containing compositions are obtained, which can be used to impart water repellency to surfaces and mineral building materials, and for other applications.

WO 2000/39177 describes the use of bis-silylaminosilanes and/or bis-silylpolysulphanes in aqueous solutions. The silanes are mixed with water, an alcohol and optionally acetic acid and hydrolysed for at least 24 hours. This is followed by application to metals.

U.S. Pat. No. 6,955,728 describes the use of acetoxysilanes in combination with other silanes in aqueous solutions and the application to metals. The systems used include bis(trialkoxysilylpropyl)amines in combination with acetoxysilanes. Nothing is said about the stability of the aqueous solutions; a 2-component system is recommended, with unification not until prior to use. The aqueous solutions always include at least the hydrolysis alcohol.

WO 2004/076717 uses bis-silylaminosilanes in combination with other silanes and with a metal chelate in aqueous solutions. The silanes are subjected to partial hydrolysis by ageing for at least 2 weeks in aqueous concentrates. Then a metal chelate is added and the system is diluted further with water. Moreover, all aqueous formulations still contain the alcohol from the hydrolysis. The aqueous systems are used for pretreating metal surfaces.

WO 2004/076718 relates to a method for the coating of a metallic surface using an aqueous solution which comprises a partially hydrolysed silane such as bis-silylaminosilane, for example, and a partially hydrolysed, fluorine-containing silane. Using the fluorine-containing silane enhances the water repellency and the corrosion resistance of the coating system. The hydrolysis alcohol is not removed from the systems.

U.S. Pat. No. 5,206,285 describes the preparation and use of water-based adducts of an epoxysilane and an aminosilane. The aqueous silane systems are not solvent-free. They are used for metal coating and are said to enhance the corrosion resistance.

EP 1 760 128 claims an aqueous two-component adhesion promoter composition and also the use thereof for adhesive bonding or sealing. One component present in the adhesion promoter may be a bis-silylaminosilane.

DE 10 2004 037 045 relates to aqueous silane nanocomposites prepared from glycidyloxypropylalkoxysilanes and aqueous silica sols in the presence of a catalyst. The aqueous systems are virtually solvent-free and are suitable for metal coatings. A disadvantage are the high crosslinking temperatures of 200° C.

U.S. Pat. No. 6,468,336 describes the formulation and use of an anti-corrosion coating for steel. The water-based formulation comprises waterglass as binder and as pigments zinc, iron phyllosilicates, and also further fillers. The formulations described are said to provide excellent corrosion control in film thicknesses of 15 to 25 µm.

EP 1 191 075 teaches a water-based two-component system for anti-corrosion coatings on steel. The first component comprises water, an aminoalkyltrialkoxysilane, an acid, an epoxysilane and conductive pigments. The second component consists of zinc powder. The completed mixture is said to allow a processing life of 16 hours. The alcohol from the hydrolysis of the silane was not removed, and the aqueous system was applied to give a dry film thickness of 25 µm. The coated metal sheets showed no corrosion after 7 months of outdoor weathering.

WO 2000/46311 describes the treatment of metal substrates with a formulation comprising a ureidosilane, a multisilylsilane and a solvent. The silanes are first partly hydrolysed and then formulated. The hydrolysis alcohol is not removed, and the formulation is used without pigments.

WO 2002/22745 claims a solvent-free anti-corrosion primer. The primer is composed of a stabilized silica sol, a phyllosilicate, a calcined aluminium phyllosilicate and zinc dust. The dry film thickness of the coating is approximately 15 to 25 µm. The abrasion resistance and the processing life were ascertained.

WO 2003/022940 describes an anti-corrosion system consisting of an aqueous silica sol, optionally an organic resin, zinc dust and further additives. The systems are characterized by the abrasion resistance and the pencil hardness.

WO 2006/079516 relates to an aqueous binder and coating material based on an aminoalkylsilane and a formylaminopropyltrialkoxysilane, respectively, and also on an epoxysilane.

In EP 1 191 075 B1, the binder is based on an aminoalkylalkoxysilane and an epoxy-functional alkoxysilane, and on a well-defined mode of preparation. The coating material disclosed therein was formulated on the basis of the binder with addition of pigments, including conductive pigments, and additives.

WO 99/14277 describes an aqueous primer composition which consists of a reactive resin (dispersion), an organofunctional silane (amino- or epoxysilane; no bis-silylsilanes) and a curing reagent. Adhesive bonds on metal substrates treated with this primer exhibit very good strengths in a shearing test in combination with an epoxy resin.

WO 2008/133916 describes a method of treating metal surfaces. The method involves treatment with an aqueous formulation consisting of hydrolysed/condensed silanes. The silanes used may be aminosilanes containing hydroxyl groups. The coating systems produced in this way are not solvent-free. The treated metal substrates were coated, and exhibit reduced scribe creep as compared with the standard treatment.

U.S. Pat. No. 6,929,826 claims a method of surface-treating metals. The method involves treating them with a formulation comprising an epoxysilane and a tetraalkoxysilane.

WO 2006/137663 describes a composition consisting of an aminosilane and an epoxysilane. The formulation further comprises a magnesium and vanadium compound and an acid. Preparation takes place in a water/alcohol mixture. The metal substrates treated with this formulation exhibit high corrosion resistance and effective adhesion to organic coatings. The systems are not solvent-free.

WO 2009/059798 discloses a formulation and coating of a metal. The formulation consists of tetraethoxysilane, vinyltrimethoxysilane, phenyltriethoxysilane, and propyltrimethoxysilane. Furthermore, other components such as alcohols, catalysts, silica sols and additives are claimed. The coatings of the invention must be heated for curing. The formulation is said to protect metal substrates from corrosion.

EP 0 274 428 teaches a composition which consists of an alkyltrialkoxysilane, a vinyltrialkoxysilane and/or further silanes such as an epoxysilane, of an organic solvent and of an aluminium sol.

WO 2009/030538 teaches aqueous compositions based on bisalkoxyalkylsilylamines that are substantially free from organic solvents and that release no alcohol even on cross-linking. Furthermore, such systems may be based on other organosilanes, such as 3-glycidyloxypropyltrialkoxysilanes, and also alkylalkoxysilanes. The systems may also include fillers, such as silica, titanium dioxide and aluminium oxide, and also colour pigments. Additionally disclosed are the preparation process and the use—including use as an anticorrosion coating.

Given appropriate formulation, silanes and aqueous silane systems are able to develop a coating on numerous substrates. These coatings are unable to develop active corrosion control, instead being able only to develop a passive corrosion coat, and may also act as binder and/or crosslinker in coating compositions. Accordingly, binders may also be seen as crosslinkers. Active corrosion control can be achieved by means of corrosion inhibitors. In order to allow such formulations, more particularly eco-friendly aqueous formulations, to be produced, the binder and the anti-corrosion additions must be compatible, in order to provide an extremely stable and effective formulation which can be processed in a reasonable time frame on the industrial scale.

An object of the present invention, accordingly, was to provide a further aqueous and largely VOC-free anti-corrosion composition based on so-called bis-aminosilane cocondensates as binders, this composition being substantially compatible with particulate additions and also, optionally, further additives, and being storage-stable as such at least for several hours to weeks before application. A particular concern, furthermore, was that such formulations can be cured at room temperature and achieve effective adhesion and corrosion control on metal substrates. Another desideratum is that anti-corrosion coatings obtainable on this basis can be applied in different film thicknesses and are readily repaintable after curing, in other words exhibiting effective adhesion to coatings, more particularly to organic (paint) coatings.

The object has been achieved in accordance with the invention in line with the features in the claims.

Thus it has been found, surprisingly, that on the basis of virtually completely hydrolysed cocondensates of an epoxyalkyl-functional alkoxysilane—cf. formula I below—with at least one bis-aminoalkyl-functional alkoxysilane—cf. also formulae II and IIa below—and also, optionally, further organo-functional alkoxysilanes and/or silica sol systems, it is possible to prepare specific aqueous binders for anti-corrosion formulations, having a defined pH and a defined dry residue; these formulations are largely VOC-free, cure in the air at low temperatures, i.e. preferably at room temperature, more preferably at 16 to 26° C., more particularly at 20° C., and, with additions from the group consisting of particulate metals, metal alloys and/or metal compounds, including metal oxides or metal salts, and also, optionally, further additives, are advantageously compatible, storage-stable and suitable for application. Using the present compositions it is possible, furthermore, to produce advantageously thin films on metal, to which further paint coats can be applied and with which at the same time it is possible to obtain effective adhesion to the primer and/or to the metal.

Binders are, generally speaking, liquids, which bond solids with a fine degree of division, additionally may have a crosslinking effect in a preparation, and allow adhesion to the substrate. In order that a formulation comprising a binder and a particulate adjuvant can be produced, the binder must be compatible with the adjuvant—that is, it must wet the adjuvant. In this way the adjuvant can be dispersed in the binder, and the positive qualities of the system are obtained. Formulations comprising a binder and adjuvant may find broad application, for example, in corrosion control. Aqueous systems are particularly advantageous in this context, since they contain substantially no organic solvents or other environmentally hazardous substances. Aqueous sol-gel systems not only are eco-friendly but are also very variable and can be put to very diverse uses. New present binders based on aqueous sol-gel systems not only are able to cure at low temperatures, but also improve the adhesion of further coatings to these systems—that is, they have good repaintability.

The application spectrum for the present aqueous binders is very diverse. They can be employed as a basis for a variety of formulations, especially as binders in combination with particulate metals and/or with particulate metal compounds and also, optionally, with further additives. If the system is to have hydrophobic properties, then an alkyltrialkoxysilane may be used as a further component alongside the epoxy-functional alkoxysilane and the bis-amino-functional alkoxysilanes. Where there is a need for specific properties on the part of the aqueous binder system, or for specific functions for coupling to an organic coating system, then further organofunctional silanes or else tetraalkoxysilanes may also be used in addition to the epoxy-functional alkoxysilanes and the bis-amino-functional alkoxysilanes. The proportions of the silane components may advantageously be adjusted in such a way that the completely hydrolysed and condensed product is stable in the aqueous solution and nevertheless cures at low temperature on the substrate or as binder in the formulation. Not only the proportion, however, but also the sequence of the metered addition has a key influence on the product properties. The hydrolysis alcohol is advantageously removed from the reaction system during the preparation of the binder, allowing the provision of a largely VOC-free aqueous product.

It has also been found that the lower the fraction of the epoxy-functional alkoxysilane in the binder, and the higher the fraction of the bis-amino-functional alkoxysilane—cf. also formula II—the lower the initial masses of silane selected can be in the aqueous formulation. The active substance of the binder consists generally of completely hydrolysed and at least partially condensed or cocondensed silanes. In order to obtain storage-stable silane systems, the solids content of the pure epoxy-functional alkoxysilane in the aqueous sol-gel system must advantageously be up to 70% by weight, while the solids content of the pure bis-amino-functional alkoxysilane ought only to be not more than approximately 10% by weight, without becoming solid. The dry residue (also designated here as solids content) of the condensates or cocondensates in the binder is situated preferably in the range from 1% to 50% by weight, more preferably between 3% and 45% by weight and very preferably between 5% and 35% by weight.

The present invention accordingly provides a composition comprising a binder comprising at least one cocondensate based on an ω-glycidyloxyalkylalkoxysilane of the formula I

in which X is a 2-(3,4-epoxycyclohexyl)ethyl, 1-glycidyloxymethyl, 2-glycidyloxyethyl, 3-glycidyloxypropyl or 3-glycidyloxyisobutyl group, $R^1$ and $R^2$ independently of one another are each a linear or branched alkyl group having 1 to 4 C atoms, and x is 0 or 1, and on at least one bis(alkoxysilylalkyl)amine of the general formula II

in which the groups $R^1$ are identical or different and $R^1$ is a linear or branched alkyl group having 1 to 4 C atoms and A is a bis-amino-functional group of the formula IIa

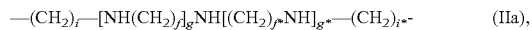

in which i, i*, f, f*, g or g* are identical or different, with i and/or i*=1, 2, 3 or 4, f and/or f*=1 or 2, g and/or g*=0 or 1, preferably with i and i* being identical to 3 and g and g* being identical to 0 and $R^1$ is methyl and/or ethyl, and also, optionally, on at least one further silicon compound from the group consisting of tetraalkoxysilane, alkylalkoxysilane, mercaptoalkylalkoxysilane, aminoalkylalkoxysilane, carboxyalkylalkoxysilane, ureidoalkylalkoxysilane, thiocyanatoalkylalkoxysilane and silica sols, water, alcohol in an amount of less than 3% by weight, preferably 0.01% to 2.5% by weight, more particularly 0.1% to 2.2% by weight, based on the composition, at least one addition from the group consisting of particulate metals, metal alloys and/or metal compounds, and optionally at least one additive, the pH in the composition being 1 to 14, preferably 2 to 13, more particularly 3.0; 3.5; 4.0; 4.5; 5.0; 5.5; 6.0; 6.5; 7.0; 7.5; 8.0, including all positive numbers from ≥2.5 to ≤12, and the dry residue of the binder being 1% to 50% by weight, preferably 5% to 40% by weight, more preferably 8% to 35% by weight, more particularly 10% to 25% by weight, additionally 2%, 3%, 4%, 6%, 7%, 9%, 11%, 12%, 13%, 14%, 15%, 16%, 17%, 18%, 19%, 20%, 21%, 22%, 23%, 24% by weight, based on the binder used.

The binder for the composition of the invention can be prepared advantageously by a procedure in which first of all water is introduced in a molar excess, based on the silanes of the formulae I and II and also, optionally, on the aforementioned silicon compounds used, and is adjusted to an acidic pH with addition of an organic or inorganic acid, a silica sol being added optionally, an ω-glycidyloxyalkylalkoxysilane of the formula I is metered in and the mixture is heated, optionally further acid is metered in, and at least one bis(alkoxysilylalkyl)amine of the general formula II and also optionally at least one further silicon compound from the group consisting of tetraalkoxysilane, alkylalkoxysilane, aminoalkylalkoxysilane, ureidoalkylalkoxysilane, carboxyalkylalkoxysilane and thiocyanatoalkylalkoxysilane is metered in and the system is caused to react, subsequently the resultant hydrolysis alcohol is removed at least proportionately from the reaction mixture under reduced pressure, the binder thus obtained is optionally diluted with water and/or an aqueous acid and is subsequently filtered, the dry residue of the binder being 1% to 50% by weight, preferably 5% to 40% by weight, more preferably 8% to 35% by weight, more particularly 10% to 25% by weight, based on the binder used.

The composition of the invention may be present advantageously as a one-component system and used as such.

It is also possible, however, to use the above-described binder and at least one of the stated additions in the form of a two-component system, the components being mixed prior to the application to give such a composition. In this case it is also possible to add further additives.

A composition of the invention advantageously has a dry residue (solids content) of 1% to 50% by weight, preferably 3% to 45% by weight, more preferably 3% to 35% by weight, based on the composition.

Furthermore, a composition of the invention is characterized by an amount of particulate metals and/or metal compounds in the composition of 1% to 95% by weight, preferably 3% to 90% by weight, more preferably 5% to 85% by weight, very preferably 10% to 80% by weight.

Additions in present compositions are preferably particulate metals, metal alloys and/or metal compounds, more particularly metal oxides, selected from the group consisting of conductive and non-conductive fillers, zinc powders, zinc flakes, zinc dust, powders and flakes of zinc alloys, such as zinc-bismuth alloys, magnesium and magnesium alloys, aluminium powders, aluminium flakes, powders and flakes of aluminium alloys, titanium dioxide, red iron oxide, yellow iron oxide, calcium carbonate, talc, aluminium silicates, barium sulphate, kaolin, magnesium silicates, crystalline quartz, amorphous quartz, calcium magnesium carbonate, calcium silicates, aluminium oxide, zeolites, wollastonites, zinc oxide, zinc phosphate, bismuth vanadate, lead chromate, silicon carbide and inorganic colour pigments.

The particulate additions here advantageously have a particle size of 5 nm to 50 μm, preferably of 10 nm to 40 μm, more preferably of 15 nm to 30 μm. The particle size may be determined by means, for example, of a Camsizer, Horiba LA-30, LB-550, and also LA-950 from Retsch Technology. The particle size may be determined accordingly from 1 nm wet and from 100 nm dry.

The conductive additions more particularly provide protection from corrosion when they are used in sufficient concentration and are in contact with the metal substrate. Hence metal substrates protected against corrosion with a coating comprising particulate metals can advantageously be welded.

Furthermore, compositions of the invention may additionally comprise additives advantageously selected from the group consisting of defoamers, thickeners, rheological assistants, dispersion assistants, anti-settling agents, rust inhibitors, wetting agents, organic pigments, polymers and polymer dispersions, and catalysts for the condensation and curing. As polymers, accordingly, it is possible for example, but not exclusively, to use acrylate dispersions, PU dispersions, epoxy resin dispersions, functionalized polyesters, water-soluble polymers, such as, for example, PVA, and polyacrylic acid—to name but a few suitable polymers. As additives or polymers or cobinders it is possible, furthermore, to use organic film-formers and also adhesion promoters based on acrylic esters, acrylic-polyester-polyurethane copolymers, ethylene-acrylic copolymers, and polyester resins having free carboxyl groups.

Compositions of the invention, accordingly, may be characterized by an amount of additives of in each case 0% to 5% by weight, more particularly of thickener of 0% to 5% by weight and/or of anti-settling agent of 0% to 5% by weight and/or of wetting agent of 0% to 3% by weight and/or of corrosion inhibitor of 0% to 1% by weight, based in each case on the composition, the sum of all the constituents present in the composition making 100% by weight.

Typical thickeners are, for example, polyacrylic acid polymers, cellulose ethers, polyurethanes, acrylate polymers, hydroxyethylcellulose, which are used at concentrations of 0.005% to 4.0% by weight, preferably of 0.008% to 3.0% by weight and very preferably of 0.01% to 2.0% by weight. Examples of thickeners and rheology modifiers include Coapur 6050 and Coapur XS 71 from Coatex.

Examples of anti-settling agents include laponites, bentonites, glycerol stearates, polyamides, xanthan, polyethylene waxes, modified and non-modified fumed silica, as for example Aerosil® R 812 S or Aerosil® R 805, which are used likewise at concentrations of up to 4% by weight, preferably 0.01% to 3% by weight, more particularly from 0.1% to 2% by weight.

Typical wetting agents are, for example, BYK 348 and also ethoxylated alcohols, which are used at concentrations of up to 3% by weight, preferably from 0.01% to 2.5% by weight or very preferably from 0.1% to 1.5% by weight.

Typical corrosion inhibitors are molybdates, phosphates, chromates, borates and also, in particular, organic corrosion inhibitors. These organic corrosion inhibitors are used at lower concentrations, suitably up to 1.0% by weight, preferably 0.8% by weight, more preferably 0.5% by weight, more particularly from 0.00001% to 0.1% by weight, based in each case on the composition, with the sum of all the constituents present in the composition making 100% by weight.

Possible catalysts for the condensation and curing are, for example, Tyzor LA (DuPont), titanium acetylacetonate and tetrakis(triethanolamine)zirconate.

The present invention further provides a process for preparing a composition of the invention, which is characterized in that first of all a binder is prepared, comprising at least one cocondensate based on an ω-glycidyloxyalkylalkoxysilane of the formula I

$$X—Si(R^2)_x(OR^1)_{3-x} \quad (I),$$

in which X is a 2-(3,4-epoxycyclohexyl)ethyl, 1-glycidyloxymethyl, 2-glycidyloxyethyl, 3-glycidyloxypropyl or 3-glycidyloxyisobutyl group, $R^1$ and $R^2$ independently of one another are each a linear or branched alkyl group having 1 to 4 C atoms, and x is 0 or 1, and on at least one bis(alkoxysilylalkyl)amine of the general formula II

$$(OR^1)_3Si-A-Si(OR^1)_3 \quad (II),$$

in which the groups $R^1$ are identical or different and $R^1$ is a linear or branched alkyl group having 1 to 4 C atoms and A is a bis-amino-functional group of the formula IIa

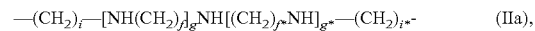

$$—(CH_2)_i—[NH(CH_2)_f]_gNH[(CH_2)_{f*}NH]_{g*}—(CH_2)_{i*}- \quad (IIa),$$

in which i, i*, f, f*, g or g* are identical or different, with i and/or i*=1, 2, 3 or 4, f and/or f*=1 or 2, g and/or g*=0 or 1, preferably with i and i* being identical to 3 and g and g* being identical to 0 and $R^1$ is methyl and/or ethyl, and also, optionally, on at least one further silicon compound from the group consisting of tetraalkoxysilane, alkylalkoxysilane, mercaptoalkylalkoxysilane, carboxyalkylalkoxysilane, aminoalkylalkoxysilane, ureidoalkylalkoxysilane, thiocyanatoalkylalkoxysilane and silica sols, said binder being prepared by a procedure in which water is introduced in a molar excess, based on the silanes of the formulae I and II and also, optionally, on the aforementioned silicon compounds used, and is adjusted to an acidic pH with addition of an organic or inorganic acid, a silica sol being added with stirring optionally, an ω-glycidyloxyalkylalkoxysilane of the formula I is metered in and the mixture is heated, optionally further acid is metered in, and at least one bis(alkoxysilylalkyl)amine of the general formula II and also optionally at least one further silicon compound from the group consisting of tetraalkoxysilane, alkylalkoxysilane, mercaptoalkylalkoxysilane, aminoalkylalkoxysilane, carboxyalkylalkoxysilane, ureidoalkylalkoxysilane and thiocyanatoalkylalkoxysilane is metered in and the system is caused to react, subsequently the resultant hydrolysis alcohol is removed at least proportionately from the reaction mixture under reduced pressure, the binder thus obtained is optionally diluted with water and/or an aqueous acid and is subsequently filtered, and at least one addition from the group consisting of particulate metals, metal alloys and/or metal compounds is dispersed into the resulting binder and also, optionally, at least one additive is incorporated with stirring.

For the preparation of the binder in this context it is preferred to use the ω-glycidyloxyalkylalkoxysilane of the formula I in a molar ratio to the bis(alkoxysilylalkyl)amine of the general formula II of 0.1:99.9 to 99:1, preferably of 1:99 to 95:5, more preferably up to 80:20, very preferably up to 70:30, more particularly the w-glycidyloxyalkylalkoxysilane is used in the binder at 0.001 to 42 mol %, preferably from 0.01 to 30 mol %, more preferably from 0.1 to 15 mol %, very preferably from 0.2 to 1.5 mol %.

The procedure more particularly in the process of the invention is that water is introduced in a molar excess, based on the silanes of the formulae I and II and also, optionally, the aforementioned silicon compounds that are used, of suitably 2 to 1000 mol of water, preferably 5 to 500 mol, more particularly 10 to 100 mol of water per mole of the Si-bonded alkoxy groups present in the silanes used, under inert gas. The inert gas used in the reaction is generally nitrogen or argon.

Furthermore, when carrying out the process of the invention, it is possible to use an organic or inorganic acid, this acid being advantageously selected from the group consisting of formic acid, acetic acid, propionic acid, hydrochloric acid, nitric acid, sulphuric acid and phosphoric acid. Said acids may be used in aqueous form or else in concentrated form. Using one of said acids, preferably with formic acid, it is possible more particularly to adjust the pH of the reaction mixtures and/or product mixtures, particularly of the binder, during and/or after the reaction, to 1 to 6.5, preferably 2 to 6, more particularly to 2.5; 3; 3.5; 4; 4.5; 5 and also 5.5, advantageously.

Surprisingly it has been found that certain of the binders used in accordance with the invention can also be stabilized in the neutral and alkaline ranges. For examples, by adding an aqueous alkali or a suitable base, it is possible to set the pH advantageously to a neutral or alkaline value, more particular to 7; 7.5, 8; 8.5; 9; 9.5; 10; 10.5; 11; 11.5; 12; 12.5; 13 and also 14—cf. the examples. Further bases besides alkalis, such as aqueous NaOH or KOH, which can be used advantageously are preferably N,N-dimethylethanolamine or else Tyzor TEAZ [tetrakis(triethanolamine)zirconate].

In the process of the invention, furthermore, it is preferred to use 3-glycidyloxypropyltrimethoxysilane and/or 3-glycidyloxypropyltriethoxysilane as ω-glycidyloxyalkylalkoxysilane of the formula I and to meter it into the acidic aqueous mixture obtained before, and to heat the mixture over 0.1 to 3 hours, preferably 0.5 to 1.5 or 2 hours, with stirring and/or mixing, to a temperature of 50 to 90° C., preferably 55 to 70° C., more particularly 60 to 65° C.

Subsequently the heated, acidic and ω-glycidyloxyalkyl-alkoxysilane-containing mixture is admixed preferably with bis(trimethoxysilylpropyl)amine and/or bis(triethoxysilylpropyl)amine. Additionally the following can be used, for example together with the bis(alkoxysilylalkyl)amine, optionally as further silicon compound: a tetraalkoxysilane, preferably tetramethoxysilane, tetraethoxysilane, an alkylalkoxysilane, preferably C1-C16-alkylalkoxysilanes, more particularly methyltrimethoxysilane, methyltriethoxysilane, n-propyltrimethoxysilane (PTMO), n-propyltriethoxysilane (PTEO), isobutyltrimethoxysilane (IBTMO), isobutyltriethoxysilane (IBTEO), octyltrimethoxysilane (OCTMO), octyltriethoxysilane (OCTEO), mercaptoalkylalkoxysilane, preferably 3-mercaptopropyltrimethoxysilane (MTMO), mercaptopropyltrimethoxysilane (MTEO), aminoalkylalkoxysilane, preferably 3-aminopropyltrimethoxysilane (AMMO), 3-aminopropytriethoxysilane (AMEO), N-(2-aminoethyl)-3-aminopropyltrimethoxysilane (DAMO), N-(2-aminoethyl)-3-aminopropyltriethoxysilane, N, N'-diaminoethyl-3-aminopropyltrimethoxysilane (TriAMO), N,N'-diaminoethyl-3-aminopropyltriethoxysilane, a ureidoalkylalkoxysilane, preferably 3-ureidopropyltrimethoxysilane, 3-ureidopropyltriethoxysilane, and/or a thiocyanatoalkylalkoxysilane, preferably 3-thiocyanatopropyltrimethoxysilane, 3-thiocyanatopropyltrimethoxysilane, carboxyalkyltrialkoxysilanes, preferably 4-(trimethoxysilyl)butanoic acid, 5-(trimethoxysilyl)pentanoic acid and 5-(triethoxysilyl)pentanoic acid. The metered addition of the aforementioned silanes here takes place advantageously at a pH of 2 to 6, preferably 3 to 5, and with stirring at 50 to 90° C., preferably 60 to 65° C. Subsequently the mixture is advantageously caused to react over 0.3 to 6 hours, preferably 2 to 4 hours, possibly accompanied by further stirring; that is, the alkoxysilanes used hydrolyse substantially completely hydrolysed and condensed or cocondensed.

From the product mixture thus obtained it is possible subsequently for the hydrolysis alcohol formed in the reaction, generally with fractions of water, to be removed at least proportionately from the reaction mixture under reduced pressure (vacuum distillation).

The binder thus present may optionally be diluted with water and/or an aqueous acid or aqueous base in order, for example, to adjust the pH, the amount of dry residue and/or the viscosity. The binder, subsequently, is suitably filtered, preference being given to the use of a fine-pored filter plate, in order to remove relatively coarse aggregates that may have formed during the reaction. A binder obtainable in this way possesses at room temperature a generally oil-like consistency, is slightly cloudy to clear, and ranges from yellowish to colourless.

Into the resulting binder it is now possible to disperse at least one addition from the group consisting of the particulate metals, metal alloys and/or metal compounds already disclosed above and also, optionally, to incorporate at least one additive, as likewise set out above, with stirring.

Furthermore, in accordance with the invention, an organic or inorganic acid selected from the group consisting of formic acid, acetic acid, propionic acid, hydrochloric acid, nitric acid, sulphuric acid and phosphoric acid and also an aqueous base selected from the group consisting of sodium hydroxide, potassium hydroxide or else Tyzor TEAZ [tetrakis(triethanolamine)zirconate] or N,N-dimethylethanolamine or other bases are preferably used, with the pH being adjusted during and/or after the reaction in the binder and/or after formulation in the composition to 1 to 14, preferably 2 to 12, more preferably 2.5 to 9, very preferably 3 to 8, more particularly to 3.5; 4; 4.5; 5; 5.5; 6; 6.5; 7; 7.5; 8 and also 8.5, in which context the addition of at least one of the aforementioned particulate metals, metal alloys and/or metal compounds to the binder may also result in a change in the pH, more particularly the addition of zinc, zinc oxide, zinc alloys, magnesium, aluminium, magnesium alloys, aluminium alloys or a micaceous iron ore, such as Miox Micron, to an acidified binder.

A composition of the invention can be produced in corresponding mixers or mixing assemblies which are known per se to the skilled person.

Further provided by the present invention is the use of a composition of the invention or composition obtainable in accordance with the invention for coatings which cure in the air at a temperature of 16 to 26° C., with more particular advantage for coatings on metals and metal alloys for protection from corrosion.

Accordingly, these specific compositions of the invention are notable with particular advantage for a comparatively excellent processing stability and outstanding user properties and also eco-friendly properties for corrosion control applications on metal substrates.

The present invention is elucidated in more detail by the examples which follow, without restriction on the subject matter of the invention.

EXAMPLES

Chemicals and Abbreviations Used:

| Trade name | Description | Manufacturer |
|---|---|---|
| Dynasylan ® GLYMO | 3-Glycidyloxypropyltrimethoxysilane (GLYMO) | Evonik Degussa |
| Dynasylan ® 1122 | Bis(triethoxysilylpropyl)amine (Bis-AMEO) | Evonik Degussa |
| Dynasylan ® AMEO | 3-Aminopropyltriethoxysilane (AMEO) | Evonik Degussa |
| Dynasylan ® PTMO | Propyltrimethoxysilane (PTMO) | Evonik Degussa |
| Dynasylan ® MTMO | 3-Mercaptopropyltrimethoxysilane | Evonik Degussa |
| Dynasylan ® 2201 EQ | 3-Ureidopropyltriethoxysilane in methanol | Evonik Degussa |
| Si 264 | 3-Isocyanatopropyltriethoxysilane | Evonik Degussa |
| Dynasylan ® A | Tetraethoxysilane (TEOS) | Evonik Degussa |
| Dynasylan ® AR | Solvent-containing sol-gel system | Evonik Degussa |
| Köstrosol ® 3550 | Silica sol, 35 nm | Chemische Werke Bad Köstritz |
| Levasil ® 100S/45 | Silica sol, 100 nm | Akzo Nobel Chemicals GmbH |
| HP 1535 | Silica sol, 30 nm | Silco International, USA |
| HP 5540 | Silica sol, 130 nm | Silco International, USA |

Additions:

| Additions | Manufacturer/supplier |
|---|---|
| Zinc dust 3 μm | Numinor |
| MIOX Micro 30 | Kärtner Montanindustrie |
| Bayferrox Red 130 BM | Harold-Scholz & Co. GmbH |
| Zinc oxide Red Seal (STD) | Numinor |
| Sibelco SiO$_2$ M500 | S.C.R.-Sibelco N.V |
| Aerosil ® 300 | Evonik Degussa |

Analytical Investigations:
Determination of pH:

The pH of the reaction mixtures was determined using pH paper (special-purpose indicator pH 2.5-4.5, Merck; pH-Fix 0.0-6.0, Machery-Nagel).

The pH values in the binders and the compositions formulated from them were determined alternatively using a Metrohm 826 pH mobile pH meter. The formulations were diluted 1:1 with water prior to measurement.

Determination of Dry Residue (Solids Content):

The solids content (also referred to as dry residue) of the aqueous silane systems was determined as follows:

1 g of the sample was weighed out into a small porcelain dish and dried to constant weight in a drying oven at 105° C.

Determination of SiO$_2$ Content:

1.0 to 5.0 g of the sample in a 400 ml glass beaker were admixed with a Kjeldahl tablet and with 20 ml of sulphuric acid and heated slowly to start with. During the heating procedure, the glass beaker was covered with a watch glass. The temperature was raised until the sulphuric acid fumed substantially and all the organic constituents were destroyed, with the solution remaining clear and light. The cold digestion solution was diluted to approximately 200 ml with distilled water and briefly boiled (water at the edge of the glass beaker is allowed to flow under the acid). The residue was filtered through a white-band filter and washed with hot water until the washing water gave a pH of >4 (pH paper). The filter was dried in a platinum crucible, ashed and calcined at 800° C. for 1 hour in a muffle furnace. After having been weighed, the residue was smoked off with hydrofluoric acid, the crucible was calcined by means of a fan burner and optionally calcined again at 800° C., and, after it had cooled, was weighed. The difference between the two weighings gave the amount of SiO$_2$.

Evaluation: D×100/E=% by weight SiO2

D=weight difference before and after heating with hydrofluoric acid, in mg

100=conversion to %

E=initial mass in mg

Determination of Free Methanol and Ethanol Content:

The alcohol determination was carried out by means of GC.

Column: RTX 200 (60 m)

Temperature programme: 90-10-25-240-0

Detector: FID

Injection volume: 1.0 μl

Internal standard: 2-butanol

Example 1

A 2 l stirred apparatus with metering device and reflux condenser was charged under nitrogen atmosphere with 1328.26 g of water and 1 g of formic acid (HCOOH=85% by weight). 90.0 g of 3-glycidyloxypropyltrimethoxysilane (GLYMO) were metered in (pH determined after the addition=3.4) and the mixture was heated to 65° C. and stirred for 1 hour. 27.0 g of formic acid (HCOOH=85% by weight) were added, and 210.0 g of Dynasylan® 1122 were metered in via the metering device. At a pH of 4.94, stirring was carried out at 65° C. for 3 hours. Finally, at approximately 130 mbar, 362.93 g of alcohol/water mixture were removed by distillation. The gel-like batch was admixed with 400.0 g of water. The residue, cooled to room temperature, was filtered on a Seitz T-950 filter plate. The final mass of the residue was 1681.4 g.

A clear, yellowish liquid having a pH of 5.6 was obtained. The product is stable on storage for at least 6 months.

Dry residue: 11.82% by weight

SiO$_2$ content: n. d.

Free methanol: 0.6% by weight

Free ethanol: 1.5% by weight

Example 2

A 2 l stirred apparatus with metering device and reflux condenser was charged under nitrogen atmosphere with 1336.0 g of water and 2 g of formic acid (HCOOH=85% by weight). 150.0 g of GLYMO were metered in (pH determined after the addition=3.0) and the mixture was heated to 65° C. and stirred for 1 hour. 19.0 g of formic acid (HCOOH=85% by weight) were added, and 150.0 g of Dynasylan® 1122 were metered in via the metering device. A further 2.94 g of formic acid (HCOOH=85% by weight) were metered in. At a pH of 3.82, stirring was carried out at 65° C. for 3 hours and a further 1.29 g of formic acid (HCOOH=85% by weight) were metered in. Finally, at a pH of 3.8 and at approximately 170 mbar, 318.07 g of alcohol/water mixture were removed by distillation. The batch was admixed with 27.67 g of water. The residue, cooled to room temperature, was filtered on a Seitz T-950 filter plate. The final mass of the residue was 1312.33 g.

A clear, yellowish liquid having a pH of 4.3 was obtained. The product is stable on storage for at least 6 months.
Dry residue: 14.9% by weight
$SiO_2$ content: 5.9% by weight
Free methanol: 1.1% by weight
Free ethanol: 1.1% by weight Example 3

A 2 l stirred apparatus with metering device and reflux condenser was charged under nitrogen atmosphere with 1338.3 g of water and 2 g of formic acid (HCOOH=85% by weight). 180.0 g of GLYMO were metered in (pH determined after the addition=2.5) and the mixture was heated to 65° C. and stirred for 1 hour. 16.7 g of formic acid (HCOOH=85% by weight) were added, and 120.0 g of bis-AMEO were metered in via the metering device. A further 1.5 g of formic acid (HCOOH=85% by weight) were metered in. At a pH of 3.8 to 4.0, stirring was carried out at 65° C. for 3 hours. Finally, at approximately 200 mbar, 342.12 g of alcohol/water mixture were removed by distillation. The batch was admixed with 74.79 g of water. The residue, cooled to room temperature, was filtered on a Seitz T-950 filter plate. The final mass of the residue was 1280.21 g.

A clear, yellowish liquid having a pH of 5.0 was obtained. The product is stable on storage for at least 6 months.
Dry residue: 15.7% by weight
$SiO_2$ content: 5.7% by weight
Free methanol: 0.7% by weight
Free ethanol: 0.5% by weight Example 4

A 2 l stirred apparatus with metering device and reflux condenser was charged under nitrogen atmosphere with 1329.2 g of water and 2 g of formic acid (HCOOH=85% by weight). 120.0 g of GLYMO were metered in (pH determined after the addition=2.5) and the mixture was heated to 65° C. and stirred for 1 hour. 25.9 g of formic acid (HCOOH=85% by weight) were added, and 180.0 g of bis-AMEO were metered in via the metering device. At a pH of 4.0, stirring was carried out at 65° C. for 3 hours. Finally, at approximately 200 mbar, 344.57 g of alcohol/water mixture were removed by distillation. The batch was admixed with 20.18 g of water. The residue, cooled to room temperature, was filtered on a Seitz T-950 filter plate. The final mass of the residue was 1304.82 g.

A clear, yellowish liquid having a pH of 4.4 was obtained. The product is stable on storage for at least 6 months.
Dry residue: 15.0% by weight
$SiO_2$ content: 6.1% by weight
Free methanol: 0.7% by weight
Free ethanol: 1.1% by weight Example 5

A 2 l stirred apparatus with metering device and reflux condenser was charged under nitrogen atmosphere with 1319.6 g of water and 2 g of formic acid (HCOOH=85% by weight). 60.0 g of GLYMO were metered in (pH determined after the addition=2.5) and the mixture was heated to 65° C. and stirred for 1 hour. 34.5 g of formic acid (HCOOH=85% by weight) were added, and 240.0 g of bis-AMEO were metered in via the metering device. At a pH of 3.8 to 4.0, stirring was carried out at 65° C. for 3 hours. Finally, at approximately 200 mbar, 356.64 g of alcohol/water mixture were removed by distillation. The batch was admixed with 95.71 g of water, in order to achieve the theoretical solids content of 15%. However, the viscosity was so high that dilution was carried out additionally with 272.2 g of water to a solids content of approximately 10%. The residue, cooled to room temperature, was filtered on a Seitz T-950 filter plate. The final mass of the residue was 1472.29 g.

A clear, yellowish liquid having a pH of 4.4 was obtained. The product is stable on storage for at least 6 months.
Dry residue: 10.4% by weight
$SiO_2$ content: 4.3% by weight
Free methanol: 0.2% by weight
Free ethanol: 0.6% by weight Example 6

A 2 l stirred apparatus with metering device and reflux condenser was charged under nitrogen atmosphere with 1346.3 g of water and 2 g of formic acid (HCOOH=85% by weight). 210.0 g of GLYMO were metered in (pH determined after the addition=2.5) and the mixture was heated to 65° C. and stirred for 1 hour. 11.73 g of formic acid (HCOOH=85% by weight) were added, and 90.0 g of bis-AMEO were metered in via the metering device. At a pH of 4.0, stirring was carried out at 65° C. for 3 hours. Finally, at approximately 180 mbar, 335.16 g of alcohol/water mixture were removed by distillation. The batch was admixed with 72.14 g of water. The residue, cooled to room temperature, was filtered on a Seitz T-950 filter plate. The final mass of the residue was 1299.86 g.

A clear, yellowish liquid having a pH of 4.2 was obtained. The product is stable on storage for at least 6 months.
Dry residue: 15.6% by weight
$SiO_2$ content: 5.8% by weight
Free methanol: 1.1% by weight
Free ethanol: 0.5% by weight Example 7

A 2 l stirred apparatus with metering device and reflux condenser was charged under nitrogen atmosphere with 1347.9 g of water and 2 g of formic acid (HCOOH=85% by weight). 240.0 g of GLYMO were metered in (pH determined after the addition=2.5) and the mixture was heated to 65° C. and stirred for 1 hour. 7.1 g of formic acid (HCOOH=85% by weight) were added, and 60 g of bis-AMEO were metered in via the metering device. At a pH of 4.0 to 4.5, stirring was carried out at 65° C. for 3 hours. In between, 3.0 g of formic acid (HCOOH=85% by weight) were metered in, to give a pH of 3.5. Finally, at approximately 180 mbar, 295.81 g of alcohol/water mixture were removed by distillation. The batch was admixed with 50.62 g of water. The residue, cooled to room temperature, was filtered on a Seitz T-950 filter plate. The final mass of the residue was 1333.38 g.

A clear, yellowish liquid having a pH of 5.2 was obtained. The product is stable on storage for at least 6 months.
Dry residue: 16.2% by weight
$SiO_2$ content: 5.6% by weight
Free methanol: 1.4% by weight
Free ethanol: 0.4% by weight Example 8

A 2 l stirred apparatus with metering device and reflux condenser was charged under nitrogen atmosphere with 1353.2 g of water and 2 g of formic acid (HCOOH=85% by weight). 270 g of GLYMO were metered in (pH determined after the addition=2.5) and the mixture was heated to 65° C. and stirred for 1 hour. 2.6 g of formic acid (HCOOH=85% by weight) were added, and 30.0 g of Dynasylan® 1122 were metered in via the metering device. At a pH of 4.3, stirring was carried out at 65° C. for 3 hours. In between, 1.1 g of formic acid (HCOOH=85% by weight) were metered in, to give a pH of 4.0. Finally, at approximately 180 mbar, 289.82 g of alcohol/water mixture were removed by distillation. The batch was admixed with 43.64 g of water and with a further 0.5 g of formic acid (HCOOH=85% by weight). The residue, cooled to room temperature, was filtered on a Seitz T-950 filter plate. The final mass of the residue was 1355.06 g.

A clear, yellowish liquid having a pH of 4.8 was obtained. The product is stable on storage for at least 6 months.
Dry residue: 16.2% by weight
$SiO_2$ content: 5.3% by weight
Free methanol: 1.7% by weight
Free ethanol: 0.2% by weight Example 9

A 2 l stirred apparatus with metering device and reflux condenser was charged under nitrogen atmosphere with 1524.8 g of water and 2 g of formic acid (HCOOH=85% by weight). 180.0 g of GLYMO were metered in (pH determined after the addition=2.0) and the mixture was heated to 65° C. and stirred for 1 hour. 15.0 g of formic acid (HCOOH=85% by weight) were added, and 105.0 g of Dynasylan® 1122 were metered in via the metering device. At a pH of 4.0, 15.0 g of n-propyltrimethoxysilane (PTMO) were added, followed by stirring at 65° C. for 3 hours. Finally, at approximately 130 mbar, 585.35 g of alcohol/water mixture were removed by distillation. The batch was admixed with 4.83 g of water and with a further 0.90 g of formic acid (HCOOH=85% by weight). The residue, cooled to room temperature, was filtered on a Seitz T-950 filter plate. The final mass of the residue was 1235.30 g. A clear, yellowish liquid having a pH of 4.5 was obtained. The product is stable on storage for at least 6 months.
Dry residue: 16.8% by weight
$SiO_2$ content: 6.3% by weight
Free methanol: 0.3% by weight
Free ethanol: 0.1% by weight Example 10

A 2 l stirred apparatus with metering device and reflux condenser was charged under nitrogen atmosphere with 1220.0 g of water and 2 g of formic acid (HCOOH=85% by weight). 165.10 g of GLYMO were metered in (pH determined after the addition=2.5) and the mixture was heated to 65° C. and stirred for 1 hour. 15.0 g of formic acid (HCOOH=85% by weight) were added, and 105.0 g of bis-AMEO were metered in via the metering device. At a pH of 4.0, 30.0 g of PTMO were added, followed by stirring at 65° C. for 3 hours. Finally, at approximately 130 mbar, 323.13 g of alcohol/water mixture were removed by distillation. The batch was admixed with 158.76 g of water. The residue, cooled to room temperature, was filtered on a Seitz T-950 filter plate. The final mass of the residue was 1196.54 g.

A clear, yellowish liquid having a pH of 4.5 was obtained. The product is stable on storage for at least 6 months.
Dry residue: 15.2% by weight
$SiO_2$ content: 6.0% by weight
Free methanol: 1.4% by weight
Free ethanol: 0.7% by weight Example 11

A 2 l stirred apparatus with metering device and reflux condenser was charged under nitrogen atmosphere with 1193.8 g of water and 2 g of formic acid (HCOOH=85% by weight). 152.6 g of Levasil 100S/45 and subsequently 210 g of GLYMO were metered in (pH determined after the addition=3.8) and the mixture was heated to 65° C. and stirred for 1 hour. 11.75 g of formic acid (HCOOH=85% by weight) were added, and 90 g of Dynasylan® 1122 were metered in via the metering device. All in all it was necessary to add a further 4.93 g of formic acid (HCOOH=85% by weight) in order to reach a pH of 3.8. This was followed by further stirring at 65° C. for 3 hours. Finally, at approximately 180 mbar, 374.22 g of alcohol/water mixture were removed by distillation. The batch was admixed with 92 g of water. The residue, cooled to room temperature, was filtered on a paint filter. The final mass of the residue was 1279.92 g.

A milkily cloudy, slightly orange liquid having a pH of 4.0 was obtained. The product is stable on storage for at least 6 months.
Dry residue: 20.3% by weight
$SiO_2$ content: 9.7% by weight
Free methanol: 0.8% by weight
Free ethanol: 0.4% by weight Example 12

A 2 l stirred apparatus with metering device and reflux condenser was charged under nitrogen atmosphere with 1041.7 g of water and 3.63 g of formic acid (HCOOH=85% by weight). 305.0 g of Levasil® 100S/45 and subsequently 210 g of GLYMO were metered in (pH determined after the addition=3.5) and the mixture was heated to 65° C. and stirred for 1 hour. 11.79 g of formic acid (HCOOH=85% by weight) were added, and 90 g of bis-AMEO were metered in via the metering device. All in all it was necessary to add a further 6.67 g of formic acid (HCOOH=85% by weight) in order to reach a pH of 3.8. This was followed by further stirring at 65° C. for 3 hours. Finally, at approximately 120 mbar, 320.71 g of alcohol/water mixture were removed by distillation. The batch was admixed with 55.38 g of water. The residue, cooled to room temperature, was filtered on a paint filter. The final mass of the residue was 1316.62 g.

A milkily cloudy liquid having a pH of 3.9 was obtained. The product is stable on storage for at least 6 months.

Dry residue: 25.4% by weight
SiO$_2$ content: 13.9% by weight
Free methanol: 1.0% by weight
Free ethanol: 0.5% by weight Example 13

A 2 l stirred apparatus with metering device and reflux condenser was charged under nitrogen atmosphere with 954.9 g of water and 2.16 g of formic acid (HCOOH=85% by weight). 392 g of HP 1535 and subsequently 210.8 g of GLYMO were metered in (pH determined after the addition=3.0) and the mixture was heated to 65° C. and stirred for 1 hour. 11.79 g of formic acid (HCOOH=85% by weight) were added, and 90 g of bis-AMEO were metered in via the metering device. All in all it was necessary to add a further 2.58 g of formic acid (HCOOH=85% by weight) in order to reach a pH of 4.0. This was followed by further stirring at 65° C. for 3 hours. Finally, at approximately 160 mbar, 291.96 g of alcohol/water mixture were removed by distillation. The batch was admixed with 12.23 g of water and also with 1.04 g of formic acid (HCOOH=85% by weight). The residue, cooled to room temperature, was filtered on a paint filter. The final mass of the residue was 1359.80 g.

A slightly yellow, milkily cloudy liquid having a pH of 4.2 was obtained. The product is stable on storage for at least 6 months.
Dry residue: 25.8% by weight
SiO$_2$ content: 15.6% by weight
Free methanol: 1.5% by weight
Free ethanol: 0.7% by weight Example 14

A 2 l stirred apparatus with metering device and reflux condenser was charged under nitrogen atmosphere with 501.8 g of water and 1.5 g of formic acid (HCOOH=85% by weight). 171.6 g of HP 5540 and subsequently 105.7 g of GLYMO were metered in (pH determined after the addition=2.0) and the mixture was heated to 65° C. and stirred for 1 hour. 5.88 g of formic acid (HCOOH=85% by weight) were added, and 44.45 g of Dynasylan® 1122 were metered in via the metering device. It was necessary to add a further 0.98 g of formic acid (HCOOH=85% by weight) in order to reach a pH of 3.8. This was followed by further stirring at 65° C. for 3 hours. Finally, at approximately 120 mbar, 159.4 g of alcohol/water mixture were removed by distillation. The batch was admixed with 24.57 g of water and also with 0.92 g of formic acid (HCOOH=85% by weight). The residue, cooled to room temperature, was filtered on a paint filter. The final mass of the residue was 661.44 g.

A milkily cloudy liquid having a pH of 4.0 was obtained. The product is stable on storage for at least 6 months.
Dry residue: 25.8% by weight
SiO$_2$ content: 15.5% by weight
Free methanol: 1.1% by weight
Free ethanol: 0.5% by weight Example 15

A 2 l stirred apparatus with metering device and reflux condenser was charged under nitrogen atmosphere with 1150.7 g of water and 2.0 g of formic acid (HCOOH=85% by weight). 196 g of HP 1535 and subsequently 210 g of GLYMO were metered in (pH determined after the addition=2.5) and the mixture was heated to 65° C. and stirred for 1 hour. 11.73 g of formic acid (HCOOH=85% by weight) were added, and 90 g of bis-AMEO were metered in via the metering device. It was necessary to add a further 2.6 g of formic acid (HCOOH=85% by weight) in order to reach a pH of 4.0. This was followed by further stirring at 65° C. for 3 hours. Finally, at approximately 230 mbar, 321.52 g of alcohol/water mixture were removed by distillation. The batch was admixed with 42.85 g of water and also with 1.0 g of formic acid (HCOOH=85% by weight). The residue, cooled to room temperature, was filtered on a paint filter. The final mass of the residue was 1329.12 g.

A milkily cloudy liquid having a pH of 4.3 was obtained. The product is stable on storage for at least 6 months.
Dry residue: 20.7% by weight
SiO$_2$ content: 10.7% by weight
Free methanol: 1.1% by weight
Free ethanol: 0.6% by weight Example 16

A 2 l stirred apparatus with metering device and reflux condenser was charged under nitrogen atmosphere with 758.8 g of water and 2.13 g of formic acid (HCOOH=85% by weight). 588 g of HP 1535 and subsequently 210 g of GLYMO were metered in (pH determined after the addition=2.5) and the mixture was heated to 65° C. and stirred for 1 hour. 11.73 g of formic acid (HCOOH=85% by weight) were added, and 90 g of Dynasylan® 1122 were metered in via the metering device. This was followed by further stirring at 65° C. for 3 hours. Finally, at approximately 300 mbar, 306.17 g of alcohol/water mixture were removed by distillation. The batch was admixed with 25.15 g of water. The residue, cooled to room temperature, was filtered on a paint filter. The final mass of the residue was 1346.94 g.

A milkily cloudy liquid having a pH of 4.2 was obtained. The product is stable on storage for at least 6 months.
Dry residue: 30.8% by weight
SiO$_2$ content: 20.5% by weight
Free methanol: 1.3% by weight
Free ethanol: 0.6% by weight Example 17

A 2 l stirred apparatus with metering device and reflux condenser was charged under nitrogen atmosphere with 831.9 g of water and 3.0 g of formic acid (HCOOH=85% by weight). 514.5 g of HP 5540 and subsequently 210 g of GLYMO were metered in (pH determined after the addition=2.0) and the mixture was heated to 65° C. and stirred for 1 hour. 11.74 g of formic acid (HCOOH=85% by weight) were added, and 90 g of Dynasylan® 1122 were metered in via the metering device. It was necessary to add a further 1.77 g in total of formic acid (HCOOH=85% by weight) in order to reach a pH of 4.0. This was followed by further stirring at 65° C. for 3 hours. In between, 1.1 g of formic acid (HCOOH=85% by weight) were metered in, to give a pH of 4.0. Finally, at approximately 180 mbar, 314.63 g of alcohol/water mixture were removed by distillation. The batch was admixed with 38.02 g of water. The residue, cooled to room temperature, was filtered on a paint filter. The final mass of the residue was 1334.02 g.

A milkily cloudy liquid having a pH of 4.3 was obtained. The product is stable on storage for at least 6 months.
Dry residue: 31.0% by weight
$SiO_2$ content: 20.7% by weight
Free methanol: 1.1% by weight
Free ethanol: 0.5% by weight Example 18

A 2 l stirred apparatus with metering device and reflux condenser was charged under nitrogen atmosphere with 1003.7 g of water and 3.0 g of formic acid (HCOOH=85% by weight). 343 g of HP 5540 and subsequently 210 g of GLYMO were metered in (pH determined after the addition=3.0) and the mixture was heated to 65° C. and stirred for 1 hour. 11.88 g of formic acid (HCOOH=85% by weight) were added, and 90 g of bis-AMEO were metered in via the metering device. It was necessary to add a further 2.32 g of formic acid (HCOOH=85% by weight) in order to reach a pH of 4.0. This was followed by further stirring at 65° C. for 3 hours. Finally, at approximately 200 mbar, 311.97 g of alcohol/water mixture were removed by distillation. The batch was admixed with 28.71 g of water. The residue, cooled to room temperature, was filtered on a paint filter. The final mass of the residue was 1343.39 g.

A milkily cloudy liquid having a pH of 4.2 was obtained. The product is stable on storage for at least 6 months.
Dry residue: 25.9% by weight
$SiO_2$ content: 15.7% by weight
Free methanol: 1.1% by weight
Free ethanol: 0.5% by weight Example 19

A 2 l stirred apparatus with metering device and reflux condenser was charged under nitrogen atmosphere with 1175.1 g of water and 3.0 g of formic acid (HCOOH=85% by weight). 171.5 g of HP 5540 and subsequently 210 g of GLYMO were metered in (pH determined after the addition=2.0) and the mixture was heated to 65° C. and stirred for 1 hour. 11.73 g of formic acid (HCOOH=85% by weight) were added, and 90 g of bis-AMEO were metered in via the metering device. It was necessary to add a further 0.91 g of formic acid (HCOOH=85% by weight) in order to reach a pH of 4.0. This was followed by further stirring at 65° C. for 3 hours. Finally, at approximately 190 mbar, 336.96 g of alcohol/water mixture were removed by distillation. The batch was admixed with 58.03 g of water. The residue, cooled to room temperature, was filtered on a paint filter. The final mass of the residue was 1314.02 g.

A cloudy, pale beige liquid having a pH of 5.0 was obtained. The product is stable on storage for at least 6 months.
Dry residue: 21.2% by weight
$SiO_2$ content: 10.7% by weight
Free methanol: 0.9% by weight
Free ethanol: 0.5% by weight Example 20

A 2 l stirred apparatus with metering device and reflux condenser was charged under nitrogen atmosphere with 1336.11 g of water and 2.07 g of formic acid (HCOOH=85% by weight). 150 g of GLYMO were metered in and the mixture was heated to 65° C. and stirred for 1 hour. 18.21 g of formic acid (HCOOH=85% by weight) were added, and 30 g of Dynasylan® A and 120 g of Dynasylan® 1122 were metered in via the metering device. This was followed by further stirring at 65° C. for 3 hours. Finally, at approximately 140 mbar, 332.97 g of alcohol/water mixture were removed by distillation. The batch was admixed with 13.65 g of water. The residue, cooled to room temperature, was filtered on a Seitz T-950 filter plate. The final mass of the residue was 1311.58 g.

A clear, yellowish liquid having a pH of 4.5 was obtained. The product is stable on storage for at least 6 months.
Dry residue: 14.7% by weight
$SiO_2$ content: 6.1% by weight
Free methanol: 1.3% by weight
Free ethanol: 1.1% by weight Example 21

A 2 l stirred apparatus with metering device and reflux condenser was charged under nitrogen atmosphere with 1419.98 g of water and 2.04 g of formic acid (HCOOH=85% by weight). 150 g of GLYMO were metered in and the mixture was heated to 65° C. and stirred for 1 hour. 11.80 g of formic acid (HCOOH=85% by weight) were added, and 60 g of Dynasylan® A and 90 g of Dynasylan® 1122 were metered in via the metering device. This was followed by further stirring at 65° C. for 3 hours. Finally, at approximately 150 mbar, 417.63 g of alcohol/water mixture were removed by distillation. The batch was admixed with 81.99 g of water. The residue, cooled to room temperature, was filtered on a Seitz T-950 filter plate. The final mass of the residue was 1306.34 g.

A clear, yellowish liquid having a pH of 4.5 was obtained. The product is stable on storage for at least 6 months.
Dry residue: 13.4% by weight
$SiO_2$ content: 5.8% by weight
Free methanol: 0.8% by weight
Free ethanol: 0.7% by weight Example 22

A 2 l stirred apparatus with metering device and reflux condenser was charged under nitrogen atmosphere with 1525.36 g of water and 2.06 g of formic acid (HCOOH=85% by weight). 180 g of GLYMO were metered in and the mixture was heated to 65° C. and stirred for 1 hour. 15.00 g of formic acid (HCOOH=85% by weight) were added, and 15 g of Si 264 and 105 g of Dynasylan® 1122 were metered in via the metering device. This was followed by further stirring at 65° C. for 3 hours. Finally, at approximately 130 mbar, 408.08 g of alcohol/water mixture were removed by distillation. The batch was admixed with 124.11 g of water. The residue, cooled to room temperature, was filtered on a Seitz T-950 filter plate. The final mass of the residue was 1417.98 g.

A clear, yellowish liquid having a pH of 4.5 was obtained. The product is stable on storage for at least 6 months.
Dry residue: 13.4% by weight
$SiO_2$ content: 5.1% by weight
Free methanol: 0.9% by weight
Free ethanol: 0.5% by weight Example 23

A 2 l stirred apparatus with metering device and reflux condenser was charged under nitrogen atmosphere with 1540.21 g of water and 2.06 g of formic acid (HCOOH=85% by weight). 180 g of GLYMO were metered in and the mixture was heated to 65° C. and stirred for 1 hour. 15.01 g of formic acid (HCOOH=85% by weight) were added, and 30 g of Dynasylan® 2201 and 105 g of Dynasylan® 1122 were metered in via the metering device. This was followed by further stirring at 65° C. for 3 hours. Finally, at approximately 150 mbar, 424.56 g of alcohol/water mixture were removed by distillation. The batch was admixed with 123.63 g of water. The residue, cooled to room temperature, was filtered on a Seitz T-950 filter plate. The final mass of the residue was 1433.42 g.

A yellowish liquid having a pH of 4.5 was obtained. The product is stable on storage for at least 6 months.
Dry residue: 13.5% by weight
$SiO_2$ content: 5.1% by weight
Free methanol: 0.8% by weight
Free ethanol: 0.4% by weight Example 24

A 2 l stirred apparatus with metering device and reflux condenser was charged under nitrogen atmosphere with 1525.28 g of water and 2.02 g of formic acid (HCOOH=85% by weight). 179.91 g of GLYMO were metered in and the mixture was heated to 65° C. and stirred for 1 hour. 15.01 g of formic acid (HCOOH=85% by weight) were added, and 15.84 g of Dynasylan® MTMO and 105.23 g of DS 1127 were metered in via the metering device. This was followed by further stirring at 65° C. for 3 hours. Finally, at approximately 200 mbar, 335.83 g of alcohol/water mixture were removed by distillation. The batch was admixed with 52.39 g of water. The residue, cooled to room temperature, was filtered on a Seitz T-950 filter plate. The final mass of the residue was 1491.77 g.

A clear, colourless liquid having a pH of 4.5 was obtained. The product is stable on storage for at least 6 months.
Dry residue: 13.5% by weight
$SiO_2$ content: 5.1% by weight
Free methanol: 1.1% by weight
Free ethanol: 0.6% by weight Example 25

A 2 l stirred apparatus with metering device and reflux condenser was charged under nitrogen atmosphere with 1525.68 g of water and 2.02 g of formic acid (HCOOH=85% by weight). 180.15 g of GLYMO were metered in and the mixture was heated to 65° C. and stirred for 1 hour. 15.01 g of formic acid (HCOOH=85% by weight) were added, and 29.98 g of Si 264 in methanol (1:1) and 105 g of Dynasylan® 1122 were metered in via the metering device. This was followed by further stirring at 65° C. for 3 hours. Finally, at approximately 130 mbar, 370.58 g of alcohol/water mixture were removed by distillation. The batch was admixed with 67.71 g of water. The residue, cooled to room temperature, was filtered on a Seitz T-950 filter plate. The final mass of the residue was 1474.32 g.

A clear, colourless liquid having a pH of 4.5 was obtained. The product is stable on storage for at least 6 months.
Dry residue: 13.6% by weight
$SiO_2$ content: 5.1% by weight
Free methanol: 1.3% by weight
Free ethanol: 0.6% by weight Example 26

A 2 l stirred apparatus with metering device and reflux condenser was charged under a nitrogen atmosphere with 1203.89 g of water and 3.00 g of formic acid (HCOOH=85% by weight). Then 135.68 g of Köstrosol 3550 were added rapidly and 180 g of Dynasylan® GLYMO were metered in via a metering device. The batch was heated to 65° C. and stirred at that temperature for 1 hour. 17.7 g of formic acid (HCOOH=85% by weight) were added, and 120 g of Dynasylan® 1122 were metered in via the metering device. After this, stirring was continued at 65° C. for 3 hours and an additional 1.11 g of formic acid (HCOOH=85% by weight) were added. Finally, at about 180 mbar, 340.64 g of alcohol/water were removed by distillation. The batch was admixed with 38.80 g of fully deionized (DI) water.

The final mass of the residue was 1347.82 g.

The batch was again distilled at approximately 180 mbar to remove 36.19 g of alcohol/water mixture, and was admixed with 51.22 g of DI water. The cooled residue was filtered on a Seitz T-950 filter plate.

The final mass of the residue was 1347.82 g.

A milky white liquid having a pH of approximately 4.3 was obtained.

The product is stable on storage for at least 6 months.
Dry residue: 20.6% by weight
$SiO_2$ content: 10.8% by weight
Free methanol: 0.4% by weight
Free ethanol: 0.7% by weight Example 27

A 2 l stirred apparatus with metering device and reflux condenser was charged under a nitrogen atmosphere with 1067.61 g of water and 3.00 g of formic acid (HCOOH=85% by weight). Then 271.09 g of Köstrosol 3550 were added rapidly and 180.16 g of GLYMO were metered in via a metering device. The batch was heated to 65° C. and stirred at that temperature for 1 hour.

After stirring at 65° C. for 1 hour, the batch was adjusted to a pH of 3.0 with an additional 2.79 g of formic acid (HCOOH=85% by weight) and stirred again at 65° C. for 0.5 hour. Then 17.71 g of formic acid (HCOOH=85% by weight) were added and 120.06 g of Dynasylan® 1122 were metered in. After this, stirring of the batch was continued at 65° C. for 3 hours and an additional 3.21 g of formic acid (HCOOH=85% by weight) were added. Finally, at about 160 mbar, 343.80 g of alcohol/water mixture were removed by distillation. The batch was admixed with 48.91 g of fully deionized (DI) water.

The cooled residue was filtered on a Seitz T-950 filter plate.

The final mass of the residue was 1308.51 g.

A milky white liquid having a pH of approximately 4.0 was obtained.

The product is stable on storage for at least 6 months.
Dry residue: 26.0% by weight
$SiO_2$ content: 15.8% by weight
Free methanol: 1.0% by weight
Free ethanol: 0.5% by weight Example 28

A 2 l stirred apparatus with metering device and reflux condenser was charged under a nitrogen atmosphere with 1203.54 g of water and 2.99 g of formic acid (HCOOH=85% by weight). Then 135.59 g of Köstrosol 3550 were added rapidly and 165 g of GLYMO were metered in via a metering device. The batch was heated to 65° C. and stirred at that temperature for 2 hours.
Dry residue: 20.4% by weight
$SiO_2$ content: 13.6% by weight Free methanol: 1.2% by weight
Free ethanol: 0.5% by weight Example 29

A 2 l stirred apparatus with metering device and reflux condenser was charged under a nitrogen atmosphere with 1203.16 g of water and 3.00 g of formic acid (HCOOH=85% by weight). Then 135.55 g of Köstrosol 3550 were added rapidly and 165 g of GLYMO were metered in via a metering device. The batch was heated to 65° C. and stirred at that temperature for 2 hours.
Dry residue: 20.5% by weight
$SiO_2$ content: 11.0% by weight
Free methanol: 1.5% by weight
Free ethanol: 0.6% by weight Example 30

A 2 l stirred apparatus with metering device and reflux condenser was charged under a nitrogen atmosphere with 1112.88 g of water and 1.01 g of formic acid (HCOOH=85% by weight). First of all 225.49 g of Köstrosol K 1530 (pH after the addition=3.5), then 180 g of GLYMO, were metered in, and the batch was heated to 65° C. and stirred for 1 hour. Then 18.71 g of formic acid (HCOOH=85% by weight) were added, and 120 g of bis-AMEO were metered in via the metering device. At a pH of 4.0, the batch was stirred at 65° C. for 3 hours. Finally, at about 130 mbar, 321.56 g of alcohol/water mixture were removed by distillation. The batch was admixed with 20.23 g of water. The residue, cooled to RT, was filtered on a Seitz T-950 filter plate. The final mass of the residue was 1334.77 g.
A liquid having a pH of 4.0 was obtained. The product is stable on storage for at least 6 months.
Dry residue: 20.9% by weight
$SiO_2$ content: 10.5% by weight
Free methanol: 1.2% by weight
Free ethanol: 0.8% by weight Example 31

A 2 l stirred apparatus with metering device and reflux condenser was charged under nitrogen atmosphere with 1220.56 g of water and 2.02 g of formic acid (HCOOH=85% by weight). 180 g of GLYMO were metered in and the mixture was heated to 65° C. and stirred for 1 hour. 15.00 g of formic acid (HCOOH=85% by weight) were added, and 90 g of bis-AMEO were metered in via the metering device. After 15 minutes, 30.0 g of PTMO were added. At a pH of 4.0, the batch was stirred at 65° C. for 3 hours. Finally, at approximately 130 mbar, 316.39 g of alcohol/water mixture were removed by distillation. The batch was admixed with 18.68 g of water. The residue, cooled to RT, was filtered on a Seitz T-950 filter plate. The final mass of the residue was 1212.58 g.
A clear, yellowish liquid having a pH of 4.0 was obtained. The product is stable on storage for at least 6 months.
Dry residue: 16.9% by weight
$SiO_2$ content: 6.7% by weight
Free methanol: 1.6% by weight
Free ethanol: 0.6% by weight Example 32

A 2 l stirred apparatus with metering device and reflux condenser was charged under nitrogen atmosphere with 1333.02 g of water and 1.98 g of formic acid (HCOOH=85% by weight). 135.69 g of GLYMO were metered in (pH after the addition=3.0) and the mixture was heated to 65° C. and stirred for 1 hour. 20.09 g of formic acid (HCOOH=85% by weight) were then added, and 120.01 g of bis-AMEO were metered in via the metering device. After 15 minutes, 44.96 g of PTMO were added. At a pH of 3.9, the batch was stirred at 65° C. for 3 hours. Finally, at approximately 130 mbar, 344.63 g of alcohol/water mixture were removed by distillation. The batch was admixed with 45.51 g of water. The residue, cooled to RT, was filtered on a Seitz K-900 filter plate. The final mass of the residue was 1340.46 g.
A clear, yellowish liquid having a pH of 3.9 was obtained. The product is stable on storage for at least 6 months.
Dry residue: 14.7% by weight
$SiO_2$ content: 6.9% by weight
Free methanol: 1.0% by weight
Free ethanol: 0.6% by weight Example 33

A 2 l stirred apparatus with metering device and reflux condenser was charged under nitrogen atmosphere with 1324.50 g of water and 2.01 g of formic acid (HCOOH=85% by weight). 120.27 g of GLYMO were metered in (pH after the addition=3.0) and the mixture was heated to 65° C. and stirred for 1 hour. 22.01 g of formic acid (HCOOH=85% by weight) were then added, and 119.75 g of bis-AMEO were metered in via the metering device. After 15 minutes, 60.35 g of PTMO were added. At a pH of 3.9, the batch was stirred at 65° C. for 3 hours. Finally, at approximately 130 mbar, 314.81 g of alcohol/water mixture were removed by distillation. The batch was admixed with 3.59 g of water. The residue, cooled to RT, was filtered on a Seitz K-900 filter plate. The final mass of the residue was 1329.04 g.
A clear, yellowish liquid having a pH of 3.9 was obtained. The product is stable on storage for at least 6 months.
Dry residue: 14.8% by weight
$SiO_2$ content: 6.0% by weight
Free methanol: 1.4% by weight
Free ethanol: 0.8% by weight Example 34

A 2 l stirred apparatus with metering device and reflux condenser was charged under nitrogen atmosphere with 1265.70 g of water and 3.05 g of formic acid (HCOOH=85% by weight). First 133.43 g of Köstrosol 3550 were metered in (pH after the addition=3.0), then 134.93 g of GLYMO, and the mixture was heated to 65° C. and stirred for 1 hour. 21.08 g of formic acid (HCOOH=85% by weight) were added, and 119.97 g of bis-AMEO were metered in via the metering device. After 15 minutes of stirring, 44.99 g of PTMO were added. At a pH of 3.9, the batch was stirred at 65° C. for 3 hours. Finally, at approximately 130 mbar, 370.09 g of alcohol/water mixture were removed by distillation. The batch was admixed with 32.57 g of water. The residue, cooled to RT, was filtered on a Seitz K-900 filter plate. The final mass of the residue was 1340.09 g.
A milkily cloudy liquid having a pH of 3.9 was obtained. The product is stable on storage for at least 6 months.
Dry residue: 19.8% by weight
$SiO_2$ content: 11.0% by weight
Free methanol: 1.3% by weight
Free ethanol: 1.1% by weight Example 35

A 2 l stirred apparatus with metering device and reflux condenser was charged under nitrogen atmosphere with 1275.04 g of water and 1.96 g of formic acid (HCOOH=85% by weight). 120.23 g of GLYMO were metered in (pH after the addition=3.0) and the mixture was heated to 65° C. and stirred for 1 hour. 18.03 g of formic acid (HCOOH=85% by weight) were added, and first 30.12 g of Dynasylan® A were added via the metering device, and the batch was stirred until it turned from slightly cloudy to clear. Then 119.98 g of bis-AMEO were metered in. After 15 minutes, 30.08 g of PTMO were added. At a pH of 3.9, the batch was stirred at 65° C. for 3 hours. Finally, at approximately 130 mbar, 340.64 g of alcohol/water mixture were removed by distillation. The residue, cooled to RT, was filtered on a Seitz K-900 filter plate. The final mass of the residue was 1259.89 g.

A clear, yellowish liquid having a pH of 3.9 was obtained. The product is stable on storage for at least 6 months.
Dry residue: 17.4% by weight (for the application tests, the product was diluted with DI water to a solids content of 15% by weight)
$SiO_2$ content: 6.2% by weight
Free methanol: 1.2% by weight
Free ethanol: 1.2% by weight
Experiments on the Stability of Aqueous Binders in the Alkaline Range

| Binder from | Solids content (% by weight) after addition of aqueous KOH | pH adjusted with aqueous KOH to | Assessment of stability of alkalified binder |
|---|---|---|---|
| Example 8 | 10 | 12 | stable |
| Example 7 | 10 | 12 | stable |
| Example 6 | 10 | 12 | stable |
| Example 3 | 10 | 12 | stable |
| Example 2 | 10 | 12 | stable |

The pH of samples of the acidic aqueous binders from Examples 2, 3, 6, 7 and 8 was adjusted to pH 12 using a 10% strength aqueous KOH solution. For this, alkali solution was added rapidly.
The examples marked in the table as "stable" were stable at the stated pH for at least 1 week.

APPLICATION EXAMPLES

1. Cleaning of the R-36 Steel Test Panels Made of DC01 C290, 152×76×0.8 mm (Rocholl)

The steel test panels were cleaned with an organic solvent (ethyl acetate) and then placed into an alkaline cleaning bath (composition: 10.0 g/l S 5610 (Chemetal), pH 11.5, 60° C., 35 seconds). Following alkaline cleaning, the metal substrates were rinsed with DI water. The excess water was blown from the surface using a compressed-air gun.

2. Corrosion Investigations

The corrosion tests (also referred to for short as NSS) were carried out in a salt spray mist (testing according to DIN 50021-SS).

The cross-cut tests were carried out in accordance with EN ISO 2409.

3. Additions Used for the Application Examples
   Zinc dust "superfine" 3 micron (Numinor) (zinc powder)
   MIOX MICRO 30 (Kärntner Montanindustrie) (natural micaceous iron ore)
   Bayferrox Red 130 BM (Harald-Scholz Co. & GmbH) (org. colourant with $Fe_2O_3$)
   Zinc Oxide Red Seal (NUMINOR) (zinc oxide)
   Sikron M500 (SIBELCO, Benelux) (crystalline silica dust, $SiO_2$ powder)

4. Binders Used for the Comparative Application Examples
   Binders used for the application examples were as follows:

| Binder 1 | reproduced according to Example 3 from WO2006/079516 (comparative composition) dry residue 16.2% by weight |
| Binder 2 | Dynasylan ® AR (comparative composition, solvent-containing) dry residue 27.3% by weight |
| Binder 3 | from Example 6 (70% GLYMO) dry residue 15.6% by weight |
| Binder 4 | from Example 2 (50% GLYMO) dry residue 14.9% by weight |
| Binder 5 | from Example 9 (60% GLYMO) dry residue 16.8% by weight |
| Binder 6 | from Example 30 dry residue 20.9% by weight |
| Binder 7 | from Example 31 dry residue 15.0% by weight |
| Binder 8 | from Example 35 dry residue 17.4% by weight |

5. Additions and preparation of additions B and C in an AM 501 T universal mixing machine from Hauschild Addition mixture B: 12.06% by weight Zinc Oxide Red Seal, 12.08% by weight Bayferrox Red 130 BM, 35.86% by weight MIOX MICRO 30, 40.00% by weight zinc dust 3 micron Addition mixture C: 43.13% by weight Sikron M500, 43.13% by weight zinc dust 3 micron, 13.74% by weight MIOX MICRO 30

Addition M: Sikron M500

Addition D: Aerosil® 300

Additions B and C were prepared in a universal mixing machine (type AM 501 T from Hauschild). Addition mixtures B and C were each mixed in the universal mixing machine at 3000 rpm for 3×30 seconds.

6. Preparation of the Compositions for the Comparative Application Examples in the Universal Mixing Machine (Type AM 501 T from Hauschild)

The addition or addition mixture in question was dispersed into the respective binder at 3000 rpm for 3×20 seconds; see Tables 1 and 2.

TABLE 1

Compositions prepared for comparative examples (the pH of the compositions was measured in each case 30 minutes following preparation):

| Comparative examples | Binder | Addition | Mass of binder [g] | Mass of addition [g] | Binder:addition weight ratio | pH |
|---|---|---|---|---|---|---|
| 1 | 1 | 75 wt % B, 25 wt % M | 4.0 | 8.0 | 1:2 | 7.1 |
| 2 | 2 | 75 wt % B, 25 wt % M | 5.0 | 16.0 | 1:3.2 | 7.2 |
| 3 | 1 | C | 4.0 | 8.0 | 1:2 | 7.2 |
| 4 | 2 | C | 4.0 | 16.0 | 1:4 | 7.1 |
| 5 | 1 | 75 wt % B, 25 wt % M | 4.0 | 8.0 | 1:2 | 7.3 |

TABLE 2

Compositions prepared for inventive application examples (the pH of the compositions was measured in each case 30 minutes following preparation):

| Application examples | Binder | Addition | Mass of binder [g] | Mass of addition [g] | Binder:addition weight ratio | pH |
|---|---|---|---|---|---|---|
| 1 | 3 | 75 wt % B, 25 wt % M | 4.0 | 8.0 | 1:2 | 7.1 |
| 2 | 4 | C | 4.0 | 8.0 | 1:2 | 7.2 |
| 3 | 5 | 75 wt % B, 25 wt % M | 4.0 | 8.0 | 1:2 | 7.1 |
| 4 | 4 | 72.5 wt % B, 22.5 wt % M, 5 wt % D | 4.0 | 8.0 | 1:2 | 7.3 |
| 5 | 6 | 75 wt % B, 25 wt % M | 4.0 | 10.0 | 1:2.5 | 7.1 |
| 6 | 7 | 75 wt % B, 25 wt % M | 4.0 | 10.0 | 1:2.5 | 7.2 |
| 7 | 8 | 75 wt % B, 25 wt % M | 4.0 | 10.0 | 1:2.5 | 7.1 |

7. Coating of the Cleaned Steel Test Panels

The formulations or compositions prepared in accordance with Tables 1 and 2 were applied to the prepared steel test panels—cf. item 1—in a wet film thickness of 80 μm, using a four-way film applicator.

After coating, the plates were dried at 20° C. for 24 hours and scribed.

The adhesion of the coated substrates was tested by means of a cross-cut test.

Results of cross-cut (EN ISO 2409) after 24 hours' curing at 20° C.:
Comparative Example 1: 1
Comparative Example 2: 1
Application Example 1: 1
Comparative Example 3: 0
Comparative Example 4: 1
Application Example 2: 1
Comparative Example 5: 2
Application Example 3: 0
Application Example 4: 1

In addition, the coated and scribed substrates were tested for corrosion resistance in a salt spray mist (DIN 50021-SS) and assessed.

Results after 26 hours' salt spray testing (cf. also Table 3):
Comparative Example 1: corrosion at the scribe and partially over the surface
Comparative Example 2: largely corrosion-free
Application Example 1: largely corrosion-free
Comparative Example 3: corrosion at the scribe and over the surface
Comparative Example 4: delaminations of the coating with corrosion
Application Example 2: largely corrosion-free Results after 150 hours in the salt spray mist (cf. also Table 3):
Comparative Example 5: corrosion at the scribe and partially over the surface
Application Example 3: no corrosion at the scribe or over the surface
Application Example 4: corrosion at the scribe and partially over the surface The sample from Application Example 3 was coated with a 2-component epoxy resin: Standox, EP primer-surfacer and Standox EP hardener. Mixing ratio 2:1 (according to specification). The coating system was applied using a bar applicator (80 μm wet film thickness, ~30 μm dry film thickness) and cured at 20° C. for 24 hours. A comparative sample (steel panel cleaned only) was likewise coated.
Cross-cut sample 1 (Application Example 3+epoxy resin coating): 0
Cross-cut sample 2 (steel panel+epoxy resin coating): 0

Both samples were scribed with a 1 mm scorer and investigated for corrosion in a salt spray mist. After 200 hours, sample 2 showed massive corrosion at the scribe and delaminations, while sample 1 was corrosion-free even at the scribe.

The results from the application investigations are summarized once again in Table 3 below, since corresponding, suitable pictures can unfortunately not be reproduced in patent specifications.

TABLE 3

Compilation of the results from the performance experiments before and after salt spray testing

| Application Example | Comparative Example | Binder | Before corrosion test cross-cut to EN ISO 2409 [1] | Corrosion test: neutral salt spray test to DIN 50021-SS Evaluation [2] | Number of hours |
|---|---|---|---|---|---|
| — | 1 | 1 | 1 | 0 | 26 h |
| — | 2 | 2 | 1 | + | 26 h |
| 1 | — | 3 | 1 | + | 26 h |
| — | 3 | 1 | 0 | -- | 26 h |
| — | 4 | 2 | 1 | - | 26 h |
| 2 | — | 4 | 1 | + | 26 h |
| — | 5 | 1 | 2 | 0 | 150 h |
| 3 | — | 5 | 0 | ++ | 150 h |
| 4 | — | 4 | 1 | 0 | 150 h |
| 5 | — | 6 | 1 | + | 150 h |
| 6 | — | 7 | 4 | 0 | 250 h |
| 7 | — | 8 | 3 | 0 | 135 h |

[1] Cross-cut after 24 hours' curing at 20° C. of the coated sample panels
[2] Evaluation:
++ no corrosion at the scribe or over the surface.
+ largely corrosion-free at the scribe and over the surface.
0 corrosion at the scribe and partially over the surface.
- delaminations of the coatings with corrosion.
-- severe corrosion at the scribe and over the surface.

To Summarize:
Comparative Examples 1 and 2 and Application Example 1 after 26 hours in the salt spray mist:
Comparative Example 1 shows corrosion at the scribe and partially over the surface after just 26 hours. In contrast, Application Comparative Example 2 and Application Example 1 are without scribe corrosion.

Comparative Examples 3 and 4 and Application Example 2 after 26 hours in the salt spray mist:
Comparative Example 3 shows corrosion at the scribe and over the surface after 26 hours in the salt spray mist, whereas Application Comparative Example 4 exhibits only some corrosion at the scribe, although some instances of delamination can be observed. The best results are shown by Application Example 2. There is no determinable corrosion at the scribe.

Comparative Example 5 and Application Examples 3 and 4 after 150 hours in the salt spray mist:
Comparative Example 5 and Application Example 4 show corrosion at the scribe after 150 hours in the salt spray mist, whereas Application Example 3 is entirely corrosion-free at the scribe after 150 hours.

Application Example 5 shows no scribe corrosion after 28, 90 or 150 hours. Over the surface, however, a slight discolouration can be observed.

Application Example 6 shows no scribe corrosion after 17 hours, partial scribe corrosion after 150 hours and almost full-depth scribe corrosion after 250 hours. The surface, however, is corrosion-free.

Application Example 7 shows no scribe corrosion after 19 hours in the salt spray mist. After 135 hours, however, full-depth corrosion at the scribe can be determined.

The invention claimed is:

1. A method of protecting a substrate from corrosion, comprising applying a composition to a substrate surface and
curing said composition in air, wherein said composition comprises:
a binder,
water,
alcohol in a positive amount of less than 3% by weight, based on a total weight of the composition,
at least one first additive selected from the group consisting of zinc powder, zinc flake, zinc dust, a powder or a flake or a dust of zinc alloys, a zinc-bismuth alloy, an aluminum powder, an aluminum flake, a powder or a flake or a dust of aluminum alloys, a magnesium powder, a magnesium flake, and a powder or a flake of magnesium alloys,
an aqueous base pH adjuster, and
optionally a further additive,
wherein:
said composition has a pH of 7.1 to 14,
a dry residue of the binder is from 1% to 50% by weight, based on a total weight of the binder,
the binder comprises:
a cocondensate based on an ω-glycidyloxyalkylalkoxysilane of formula I

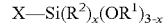

$$X\text{—}Si(R^2)_x(OR^1)_{3-x} \quad (I),$$

wherein X is a 2-(3,4-epoxycyclohexyl)ethyl, 1-glycidyloxymethyl, 2-glycidyloxyethyl, 3-glycidyloxypropyl or 3-glycidyloxyisobutyl group, $R^1$ and $R^2$ each independently are a linear or branched alkyl group comprising from 1 to 4 C atoms, and x is 0 or 1,
a bis(alkoxysilylalkyl)amine of formula II

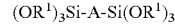

$$(OR^1)_3Si\text{-}A\text{-}Si(OR^1)_3 \quad (II),$$

wherein each $R^1$ independently is a linear or branched alkyl group comprising from 1 to 4 C atoms and A is a bis-amino-functional group of formula IIa

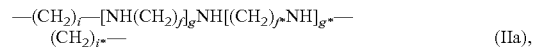

$$\text{—}(CH_2)_f\text{—}[NH(CH_2)_f]_g NH[(CH_2)_{f^*}NH]_{g^*}\text{—}(CH_2)_{i^*}\text{—} \quad (IIa),$$

wherein i and i* each independently are an integer of 1, 2, 3 or 4, f and f* each independently are an integer of 1 or 2, and g and g* each independently are an integer of 0 or 1,
and optionally, at least one further silicon compound selected from the group consisting of tetraalkoxysilane, alkylalkoxysilane, mercaptoalkylalkoxysilane, carboxyalkylalkoxysilane, aminoalkylalkoxysilane, ureidoalkylalkoxysilane, thiocyanatoalkylalkoxysilane and a silica sob; and
said substrate is at least one substrate selected from the group consisting of a metal and a metal alloy.

2. The method according to claim 1, wherein the binder is obtained by a process comprising:
introducing water in a molar excess, based on silanes of the formulae I and II and, optionally, on the at least one further silicon compound and adjusting to an acidic pH with addition of an organic or inorganic acid, and an optional addition of a silica sol,
metering in the w-glycidyloxyalkylalkoxysilane of formula I, thereby obtaining a mixture,
heating the mixture,
optionally metering in further acid,
metering in the bis(alkoxysilylalkyl)amine of formula II and optionally at least one further silicon compound selected from the group consisting of tetraalkoxysilane, alkylalkoxysilane, mercaptoalkylalkoxysilane, carboxyalkylalkoxysilane, aminoalkylalkoxysilane, ureidoalkylalkoxysilane and thiocyanatoalkylalkoxysilane, thereby obtaining a reaction mixture,
reacting the reaction mixture,
subsequently removing at least proportionately a resultant hydrolysis alcohol from the reaction mixture under reduced pressure, thereby obtaining the binder,
optionally diluting the binder with water, an aqueous acid, or both, and
subsequently filtering the binder.

3. The method according to claim 1, wherein a dry residue is from 1% to 50% by weight, based on the total weight of the composition.

4. The method according to claim 1, wherein an amount of the at least one first additive in the composition is from 1% to 95% by weight.

5. The method according to claim 1, wherein the further additive is selected from the group consisting of a defoamer, a thickener, a rheological assistant, a dispersion assistant, an anti-settling agent, a rust inhibitor, a wetting agent, an organic pigment, a polymer, a polymer dispersion, and catalyst for condensation and curing.

6. The method according to claim 1, wherein, based on the total weight of the composition, the further additive is at least one of a thickener of from 0% to 5% by weight, an anti-settling agent of 0% to 5% by weight, a wetting agent of 0% to 3% by weight, and a corrosion inhibitor of 0% to 1% by weight.

7. The method according to claim 1, further comprising curing said coating in air at a temperature of 16 to 26° C.

8. The method according to claim 1, wherein the composition has a pH of from 7.3 to 14.

9. The method according to claim 1, wherein the at least first additive is zinc dust.

10. The method according to claim 1, wherein the composition has a pH of 7.5 to 14.

11. The method according to claim 1, wherein the composition has a pH of 7.1 to 12.

12. The method according to claim 1, wherein the composition has a pH of 7.1 to 7.3.

13. The method according to claim 1, wherein the composition has a pH of 8.0 to 14.

* * * * *

UNITED STATES PATENT AND TRADEMARK OFFICE
CERTIFICATE OF CORRECTION

Page 1 of 1

PATENT NO. : 11,168,221 B2
APPLICATION NO. : 16/251303
DATED : November 9, 2021
INVENTOR(S) : Philipp Albert and Eckhard Just It is certified that error appears in the above-identified patent and that said Letters Patent is hereby corrected as shown below:

On the Title Page

Column 1, Item (72), Line 1 of Inventors, "Philipp Albert, Loerrach (DE);" should read --Philipp Albert, Rheinfelden (DE);--.

Signed and Sealed this
Fourth Day of January, 2022

Drew Hirshfeld
*Performing the Functions and Duties of the
Under Secretary of Commerce for Intellectual Property and
Director of the United States Patent and Trademark Office*